United States Patent
O'Neill et al.

(10) Patent No.: US 8,347,503 B2
(45) Date of Patent: Jan. 8, 2013

(54) METHODS OF MANUFACTURING BRAZED ALUMINUM HEAT EXCHANGERS

(75) Inventors: Patrick S. O'Neill, Williamsville, NY (US); Thomas J. Godry, Kenmore, NY (US); Dennis P. Held, East Aurora, NY (US)

(73) Assignee: UOP LLC, Des Plaines, IL (US)

( * ) Notice: Subject to any disclaimer, the term of this patent is extended or adjusted under 35 U.S.C. 154(b) by 1227 days.

(21) Appl. No.: 12/164,747

(22) Filed: Jun. 30, 2008

(65) Prior Publication Data

US 2009/0320291 A1 Dec. 31, 2009

(51) Int. Cl.
*B23P 15/26* (2006.01)

(52) U.S. Cl. .................. 29/890.054; 29/890.03; 165/166

(58) Field of Classification Search ............. 29/890.046, 29/890.03, 890.038, 890.039, 890.051, 890.054; 165/165–167; 228/183
See application file for complete search history.

(56) References Cited

U.S. PATENT DOCUMENTS

| | | | | |
|---|---|---|---|---|
| 3,470,950 A * | 10/1969 | Menkus | .................. | 165/165 |
| 3,537,935 A * | 11/1970 | Somerville | ................... | 156/382 |
| 4,258,783 A * | 3/1981 | Albertson et al. | ............. | 165/133 |
| 4,653,572 A | 3/1987 | Bennett et al. | | |
| 4,665,974 A * | 5/1987 | Grehier et al. | ................ | 165/165 |
| 4,700,771 A | 10/1987 | Bennett et al. | | |
| 4,715,431 A | 12/1987 | Schwarz et al. | | |
| 4,715,433 A | 12/1987 | Schwarz et al. | | |
| 4,767,497 A * | 8/1988 | Shattes et al. | ................. | 216/104 |
| 4,846,267 A * | 7/1989 | Shattes et al. | ................. | 165/133 |
| 4,903,389 A * | 2/1990 | Wolf | ........................ | 29/890.043 |
| 5,014,773 A * | 5/1991 | Beduz et al. | ................... | 165/115 |
| 5,183,106 A * | 2/1993 | Stancliffe et al. | ............. | 165/166 |
| 5,322,209 A | 6/1994 | Barten et al. | | |
| 5,699,671 A | 12/1997 | Lockett et al. | | |
| 5,868,199 A * | 2/1999 | Lavin | ............................ | 165/166 |
| 6,325,276 B1 | 12/2001 | Kawano et al. | | |
| 6,393,866 B1 | 5/2002 | Srinivasan et al. | | |
| 7,147,046 B2 * | 12/2006 | Sanada et al. | ................. | 165/140 |
| 7,234,511 B1 * | 6/2007 | Lesage | ............................ | 165/69 |
| 7,677,300 B2 * | 3/2010 | O'Neill et al. | ................ | 165/166 |
| 2007/0028649 A1 | 2/2007 | Chakravarthy et al. | | |
| 2008/0041573 A1 | 2/2008 | O'Neill et al. | | |
| 2009/0133861 A1 * | 5/2009 | Kim | ............................ | 165/170 |

OTHER PUBLICATIONS

Robertson, J.M., Lovegrove, P.C.; "Boiling Heat Transfer With Freon 11 (R11) in Brazed Aluminum, Plate-Fin Heat Exhangers," Journal of Heat Transfer (ISSN 0022-1481) V105 N.3 605-10 (Aug. 1983), American Society of Mechanical Engineers.

(Continued)

*Primary Examiner* — David Bryant
*Assistant Examiner* — Ryan J Walters
(74) *Attorney, Agent, or Firm* — Mark R. Willis

(57) ABSTRACT

Methods for manufacturing brazed aluminum heat exchangers involved in boiling and condensing, including a high performance nucleate boiling surface bonded with the walls of fin-less boiling passages. One method includes providing a first heat exchanger core subassembly including a first joinable end, at least one cooling and one boiling passage, and a first partial finless passage arranged at the joinable end. A second heat exchanger core subassembly is provided similar to the first including a second joinable end. The first and second heat exchanger core subassemblies are brazed. The first joinable end is affixed, preferably by welding, to the second joinable end and the first partial finless passage is affixed to a second partial finless passage to form a coupled finless passage, and thereby a heat exchanger core.

12 Claims, 3 Drawing Sheets

OTHER PUBLICATIONS

Robertson, J.M., "Boiling Heat Transfer With Liquid Nitrogen in Brazed-Aluminum Plate-Fin Heat Exchangers," The American Institute of Chemical Engineers, 1979, San Diego, CA, AICHE Symposium Series, vol. 75 N. 189, 151-64.

Suslov, A.A., "Vacuum Brazing of Aluminum-Alloy Heat Exchangers," Soviet Engineering Research, v. 10, n. 5, 1990, p. 29-30.

Yoon, Sanghoon; Kim, Hyungjun; Lee, Changhee, "Fabrication of Automotive Heat Exchanger Using Kinetic Spraying Process," (Kinetic Spray Coating Laboratory (NRL), Division of Materials Science and Engineering, Hanyang University); Surface and Coatings Technology, v. 201, n. 24, Oct. 15, 2007, p. 9524-9532, Publisher: Elsevier.

Caplan, D.; Nippes, Ernest F., "High-Temperature brazing of Aluminum Bronze to Inconel," Welding Journal, v. 36, n. 10, Oct. 1957, p. 457s-464s, Publisher: American Welding Society.

Kanda, Kiichi (Kanto Yakin Kogyo Co., Ltd.); Hashimoto, Hiromu, "Studies of Aluminum Brazing by Low Oxygen Atmosphere Furnace," Keikinzoku Yosetsu/Journal of Light Metal Welding and Construction, v. 45, n. 9, Sep. 2007, p. 431-437, Language: Japanese; Publisher: Japan Light Metal Welding and Construction Association.

Winterbottom, W. L.; Gilmour, G.A., "Vacuum Brazing of Aluminum: Auger Studies of Wetting and Flow Characteristics," Journal of Vacuum Science and Technology, v. 13, n. 2, Mar.-Apr. 1976, p. 634-643.

* cited by examiner

METHODS OF MANUFACTURING BRAZED ALUMINUM HEAT EXCHANGERS

BACKGROUND OF THE INVENTION (1) Field of the Invention

This invention concerns methods for the manufacture of brazed aluminum heat exchangers. In particular, the invention is directed to methods of manufacturing brazed aluminum heat exchangers by affixing brazed heat exchanger core modules together to form complete heat exchanger devices.

(2) Description of the Related Art

A common heat exchanger used in cryogenic, refinery and chemical applications is the plate-fin brazed aluminum heat exchanger. Typical brazed aluminum heat exchangers are fabricated by disposing corrugated aluminum sheets between aluminum parting sheets or walls to form a plurality of fluid passages. The aluminum parting sheets are typically 1 mm thick for lower operating pressures, and as thick as 4 mm for exchangers used in high pressure service. The sheets are either clad with an aluminum brazing layer or a layer of brazing foil is inserted between the surfaces to be bonded. When heated to a predetermined temperature for a predetermined period of time, the brazing foil or cladding melts and forms a metallurgical bond with the adjacent sheets. The resulting assembly contains numerous passages consisting of alternate layers of closely spaced fins. A typical arrangement of alternate layers of passages each containing fins with a density of 6 to 10 fins/cm (15 to 25 fins/inch), and a fin height of 0.5 to 1 cm (0.2 to 0.4 inch). In a common application of such heat exchanger cores, a first series of passages carry vapor for condensing, while a second series of passages, interleaved in an alternate fashion with the first series of passages, carry a liquid for boiling. Typical brazed aluminum heat exchangers must be able to withstand 2068 to 2758 kPa (300 to 400 psia). Brazed aluminum heat exchangers can be designed for operating pressures in excess of 1000 psia, but exchangers of most interest in this invention typically operate at pressures less than 300 psia.

FIG. 1 shows a diagrammatic cross-sectional representation of a prior art brazed aluminum heat exchanger core in a general form. The brazed aluminum heat exchanger core 20 includes a cap sheet 22 on a top or first end 24, and another cap sheet 26 on a bottom or second end 28 of the heat exchanger. The core 20 includes a plurality of finned passages 30. The finned passages 30 include boiling passages 32 and condensing passages 34 that are arranged in the core 20 in an alternate or interleaved fashion. Side bars 36 bracket the core 20. It will be understood that the core depicted is only a part of a heat exchanger, and that after the core is assembled and subjected to heating and thus, brazed into a heat exchanger core, hand welding is typically performed to complete manufacture of the heat exchanger, including the attachment of headers and manifolds as is known in the art.

Many conventional brazed aluminum heat exchangers typically contain fins in all passages and are brazed as a single unit in large, specially designed vacuum brazing furnaces. Only a handful of companies worldwide have the capability to manufacture very large heat exchanger cores and fixtured assemblies, in a size which is, for example, 4'×4'×24' long. Due to the passages all containing fins, such as for example, plain fins, plain-perforated fins, serrated fins, herringbone or wavy fins, this design is best assembled and brazed in one step. Furthermore, the vacuum furnaces that can accommodate and effect the brazing of these size heat exchanger assemblies are very costly, and indeed, since a great deal of capital has been invested in vacuum brazing assemblies of this size, these companies prefer to braze heat exchangers as single cores.

Because of the large size of conventional heat exchangers, a furnace brazing cycle may be 24 hours or more. The large size of conventional heat exchanger cores, coupled with the fact that all of the passages of conventional cores are typically finned passages, leads to a scenario where manufacturers find it advantageous to assemble the cores into a single unit, and then braze the cores in a large vacuum oven in one step. Brazing of single core units is thought to reduce the number of steps, or amount of hand labor required in welding, which is attractive generally when automated processes are available.

As suggested above, one of the disadvantages of the single step brazing process is the requirement of using one of the few facilities where large vacuum brazing furnaces are available. Another disadvantage is the time it takes to perform the brazing operation, because of the size and configuration of the large core units. Because of the amount of time required to perform the brazing step, there exists the potential of uneven heating of parts of the heat exchanger core and the potential of resultant damage, such as distortion or bowing of core elements and over-brazing or under-brazing of core joints or elements.

Some heat exchangers include surfaces comprising enhanced boiling layers (EBLs). EBLs are well known in the art. Enhanced boiling layers were first proposed for heat exchangers in U.S. Pat. No. 3,384,154. This patent discloses mixing metal powder in a plastic binder in solvent and applying the slurry to a base metal surface. The coated metal is subjected to a reducing atmosphere and heated to a temperature for sufficient time so that the metal particles sinter (bond) together and to the base metal surface. U.S. Pat. No. 3,457,990 discloses an enhanced boiling surface with reentrant grooves mechanically or chemically formed therein.

Other methods of applying EBLs have been disclosed. GB 2 034 355 discloses applying an organic foam layer to a metal heat transfer member and plating the foam with metal such as copper first by electroless plating, then by electro-deposition. U.S. Pat. No. 4,258,783 discloses mechanically forming indentations in a heat transfer surface and then electrodepositing metal on the pitted surface. GB 2 062 207 discloses applying metal particles to a metal base by powder flame spraying. EP 303 493 discloses spraying a mixture of metal and plastic material onto a base metal by flame or plasma spraying. U.S. Pat. Nos. 4,767,497 and 4,846,267 disclose the heat-treating of an aluminum alloy plate to produce a precipitate followed by chemically etching away the precipitate to leave a pitted surface. EP 112 782 discloses applying a mixture of brazing alloy and spherical particles to a metallic wall and heating the coated wall to melt the brazing material.

Patents proposing replacing fins with an enhanced boiling layer in the boiling passages of a brazed heat exchanger include U.S. Pat. Nos. 5,868,199; 4,715,431 and 4,715,433. These patents propose to stack aluminum sheets each with an EBL applied on one side to define boiling channels and with fins on the other side of the aluminum sheets to define condensing channels. Layers of brazing material are disposed between bonding surfaces in the stack, and the stack is subjected to heating over a period of time to obtain a brazed heat exchange core. Such brazed aluminum heat exchangers described in these patents have not been commercialized because EBLs are typically brazed at 565 to 593 degrees C. (1050 to 1100 degrees F.) while the subsequent brazing of the metal components together occur at around 593 to 621 degree C. (1100 to 1150 degrees F.). Maintaining the integrity and effectiveness of the EBL, particularly the porous structure provided by the mutually bonded metal particles, during the second hotter heat treatment to effect brazing has been difficult. This difficulty accounts for the lack of commercially available brazed heat exchangers with EBL in the boiling passages. An additional concern for EBLs with the porous structure is the volume of gas products formed during the brazing of large heat exchangers, wherein there can be a problematic volume of gas produced during heating, which is directly related to the size of the fabricated units.

In vacuum brazing operations, such as those described above, the length of time of the heat cycle can contribute to the damaging of the enhanced boiling layer and thus, ultimately of the integrity and efficiency of the operation of the heat exchanger. One solution is proposed in U.S. Patent Publication No. 2008/0041573, which not only describes an effective EBL, but also describes how heat exchanger cores are provided with EBLs and how these heat exchanger cores and heat exchangers are manufactured.

There is a need for a method of manufacturing brazed aluminum heat exchangers in such a fashion so as to provide increased manufacturing flexibility while retaining or increasing the efficiency and integrity of brazed aluminum heat exchangers. The invention satisfies the need.

SUMMARY OF THE INVENTION

The invention solves one or more of the problems identified above by providing a method whereby brazed aluminum heat exchangers can be manufactured in relatively smaller brazing furnaces compared to those required by conventional heat exchanger cores. The benefits of the methods according to embodiments of the invention include reduced furnace time, improved temperature control and improved brazed joint and boiling surface quality.

The modular construction embodied in the invention is preferred for two types of brazed aluminum heat exchangers with EBLs in finless passages of the heat exchangers. The first is a countercurrent flow arrangement where both the boiling and cooling streams flow vertically. The second type is known in the art as "cross flow" type. In this example, the cooling stream typically flows horizontally, while the boiling stream flows vertically and perpendicular to the cooling stream. The alternate passages are interleaved, but the stream orientation is different in this type of heat exchanger.

In one aspect, the invention includes assembling brazed aluminum heat exchanger cores as subassemblies or modules into a specific configuration, brazing the modules in a vacuum brazing oven, and welding the brazed modules to form complete heat exchanger cores.

In another aspect, the invention discloses a method of constructing a heat exchanger, including providing a method of constructing a heat exchanger, including providing a first heat exchanger core subassembly including a first joinable end, at least one cooling passage, at least one boiling passage, and a first partial finless passage arranged at the joinable end. A second heat exchanger core subassembly is provided including a second joinable end, at least one cooling passage, at least one boiling passage, and a second partial finless passage arranged at the joinable end. The first and second heat exchanger core subassemblies are subjected to a temperature and for a time sufficient to braze the first and second heat exchanger core subassemblies. The first joinable end is affixed, preferably by welding, to the second joinable end and the partial finless passage is affixed to the second partial finless passage to form a coupled finless passage, and thereby a heat exchanger core is formed.

In other aspects of the invention the boiling passages may be finless. An enhanced boiling layer may be disposed on the surfaces of the boiling passages. The first and second partial passages may include an EBL disposed thereon. The enhanced boiling layer, typically 0.3 mm to 0.5 mm thick, may be provided to the surfaces of the coupled finless passage. The coupled finless passage may be nonfunctional. The boiling passages may be provided with support bars, and the coupled finless passage may be without support bars.

In yet other aspects of the invention, a third heat exchanger core subassembly may be provided wherein the third heat exchanger core subassembly includes a pair of joinable ends positioned on opposite ends of the third heat exchanger core assembly. The third heat exchanger core assembly may further include at least one cooling passage, at least one boiling passage, a third partial finless passage positioned at one of the pair of joinable ends and a fourth partial finless passage positioned at the other of the pair of joinable ends, and one of the pair of joinable ends at the third partial finless passage is welded to the first finless passage of the first heat exchanger core subassembly and the other of the pair of joinable ends at the fourth partial finless passage is welded to the second finless passage of the second heat exchanger core subassembly to form corresponding coupled finless passages and a heat exchanger core. Support bars may be provided in each of the boiling passages, wherein the coupled finless passages have no support bars.

In yet a further aspect of the invention, a boiling header is affixed to be in fluid communication with an inlet to the boiling passages. A cooling header is affixed to be in fluid communication with an inlet to the cooling passages. A boiling manifold is affixed to be in fluid communication with an outlet of the boiling passages and a cooling manifold is affixed to be in fluid communication with an outlet of the cooling passages. Distributors are often used to turn the cooling fluid in the case where fluid entry is perpendicular to the boiling fluid flow, as is well known in the art.

DETAILED DESCRIPTION OF THE INVENTION

The present invention relates to methods of constructing a heat exchanger. The methods of this invention are described below with reference to FIGS. 2-5. In its most general form, the invention includes the manufacture of heat exchanger cores 120 (see FIG. 5) by assembling or stacking heat brazed aluminum heat exchanger core subassemblies or heat exchanger core modules and welding the subassemblies together to form complete assembled heat exchangers cores.

Each of the modules is assembled by stacking layers of elements in a specific configuration as will be described below in more detail.

Figure 1:
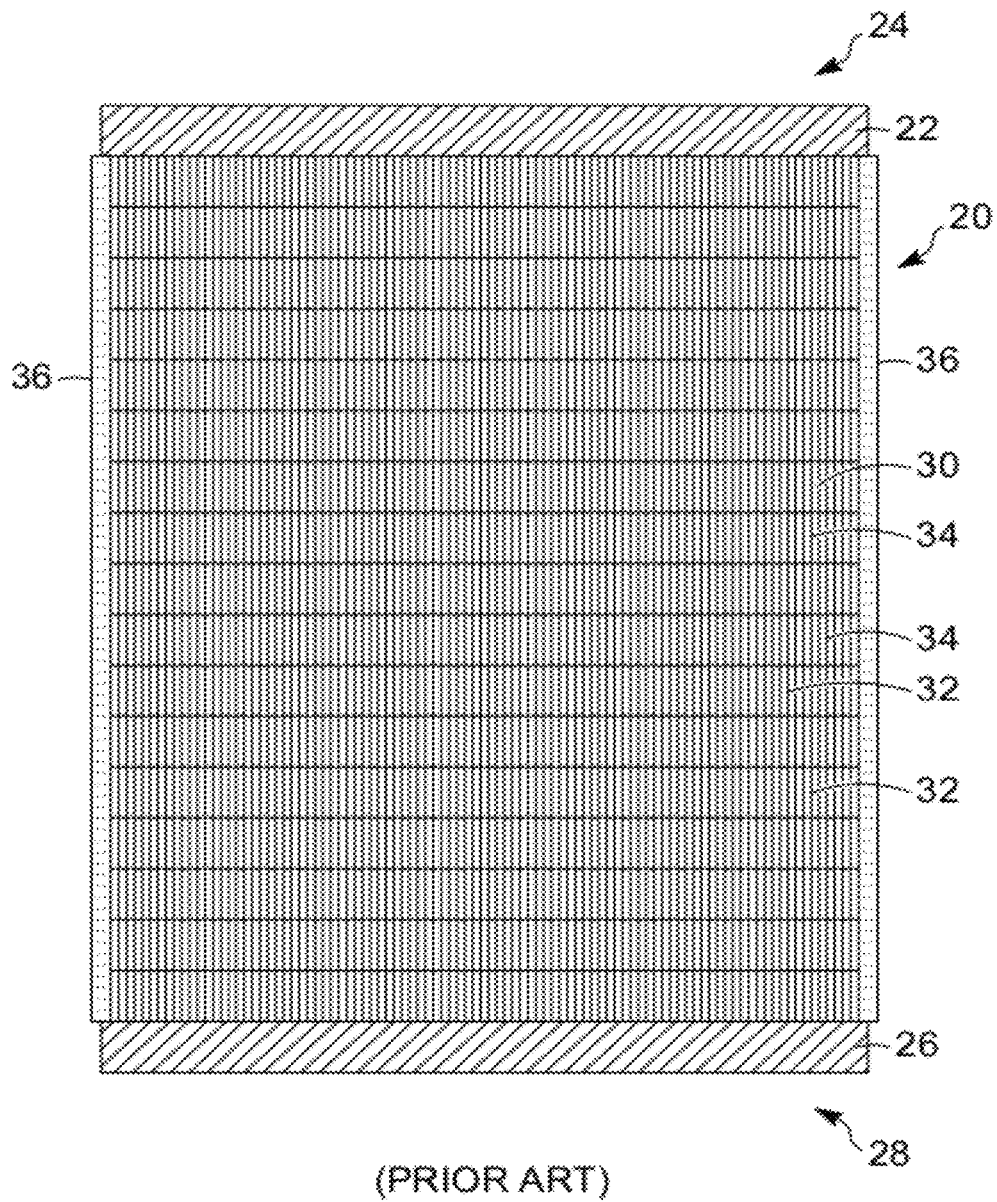
FIG. 1 is a cross sectional view of a prior art brazed aluminum heat exchanger.
Figure 2:
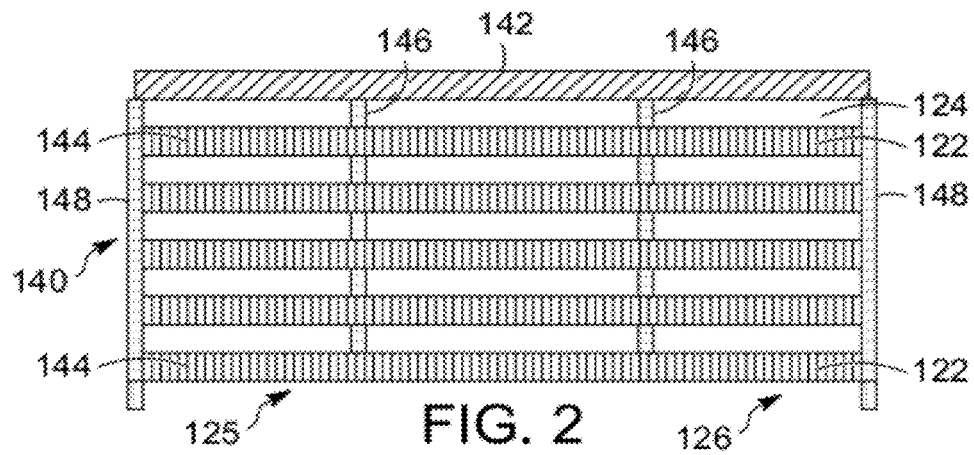
FIG. 2 is a cross sectional view of a top or end module for a brazed aluminum heat exchanger according to one embodiment of the invention.
Figure 3:
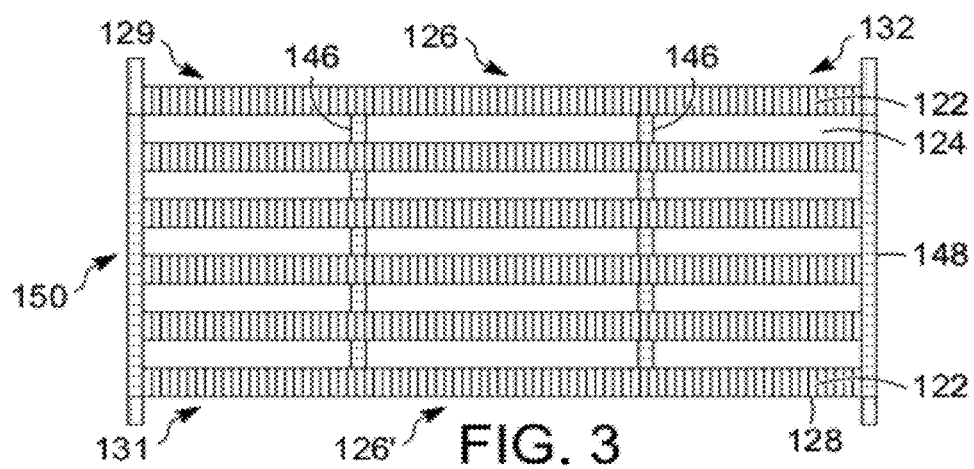
FIG. 3 is a cross sectional view of a brazed aluminum heat exchanger middle module according to one embodiment of the invention.
Figure 4:
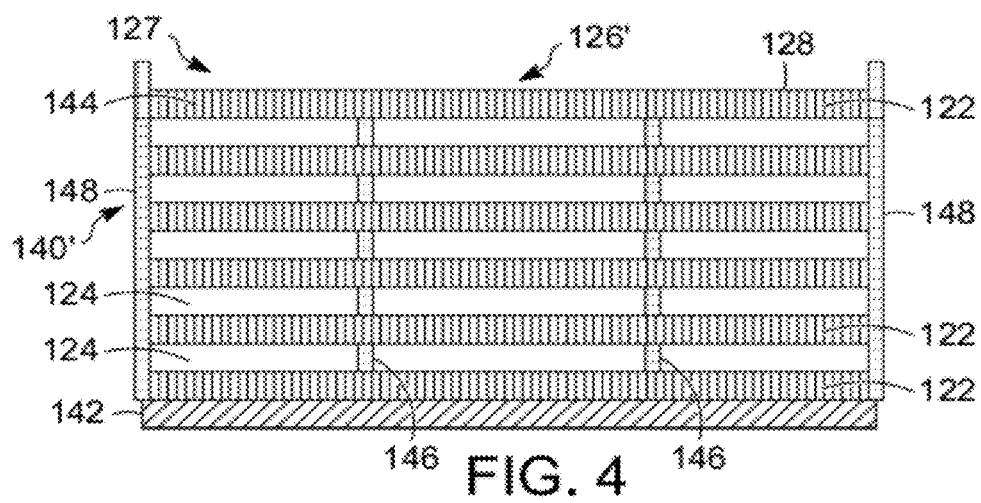
FIG. 4 is a cross sectional view of a brazed aluminum heat exchanger top or end module according to one embodiment of the invention.

As shown in FIGS. 2-4, each module includes at least one cooling passage 122 and one boiling passage 124, and preferably more than one of each type of passage. One or more ends of each module are adapted to be joined to another module with structural elements whereby a finless passage is formed when the modules are joined. Hereinafter the part of each module adapted to be joined to another module will be referred to as a joinable side 126' (see FIGS. 3 and 4) or join side or end.

Each joinable side 126' may include features including a high performance nucleate boiling surface 128, i.e., an enhanced boiling layer (EBL), to form a functional coupled boiling passage 130 when two such joinable sides are connected together. It will be understood that the resulting functional coupled boiling passages 130 will not have fins. Because the joinable sides 126' do not require the positioning of fins therebetween when joining modules to each other, by welding, for example, it is possible to hand weld modules together.

In the alternate, each joinable side 126 (see FIGS. 2 and 3) will have features to form a nonfunctional coupled passage 132, i.e., provided with no elements for performing a boiling or cooling function, when two such joinable sides are connected together. Nonfunctional passages 132 are also devoid of fins or similar structure. In other words, the side 126 of the module that is adapted to be joined to another module can form either a functional coupled boiling passage 130 or a nonfunctional coupled passage 132, when so joined, but cannot in either case include fins or be a finned passage when joined. More specifically, the join side 126 of each module comprises a half of a finless passage, whether it be functional or nonfunctional. The nonfunctional coupled passage 132 may be considered a nonfunctional spacer passage or void. In cases where the heat exchanger must be designed for a higher boiling pressure, the parting sheets facing into the nonfunctional passage may be thicker than the typical 1 mm-2 mm thickness of parting sheets with the EBL. These sheets would be 3 mm-4 mm thick and contain neither an EBL nor a finned structure.

Turning specifically to FIG. 2, a top or end module 140 for a brazed aluminum heat exchanger includes a top or end cap sheet 142. A typical thickness for the top cap sheet 142 may be 0.25 inches. Adjacent the cap sheet 142 may be a finless boiling passage 124. Each boiling passage is preferably provided with an EBL applied to the inside surfaces thereof. Adjacent to the boiling passage 124 is a cooling passage 122 provided with fins 144, as is known in the art. The cooling and boiling passages 122, 124 are arranged in an alternate or interleaved fashion.

Each boiling passage 124 is typically provided with permanent support bars 146. Preferably, the support bars 146 are provided in pairs and may be spaced in a configuration from about 8-12 inches apart and similarly spaced from side bars 148. Other spacing of the bars 146 is contemplated.

The end module 140 includes a joinable side 126, which is not provided with an EBL, in this example. The joinable side 126 comprises a partial finless passage 125. When joined to a similar joinable side 126, of another module, a nonfunctional coupled passage 132 is formed by coupling adjacent partial finless passages. Inboard from each joinable side 126, is a cooling passage 122.

FIG. 4 shows a bottom or end module 140' for a brazed aluminum heat exchanger including a bottom or end cap sheet 142. A typical thickness for the cap sheet 142 may be 0.25 inches. Adjacent the cap sheet 142 may be a cooling passage 122. Each cooling passage 122 is provided with fins 144, as is known in the art. Adjacent to the cooling passage 122 is a finless boiling passage 124. Each boiling passage may be provided with an EBL applied to the inside surfaces thereof. The cooling and boiling passages 122, 124 are provided in an alternate, interleaved fashion.

Each boiling passage 124 is typically provided with permanent support bars 146. Preferably, the support bars 146 are provided in pairs and may be spaced in a configuration from about 8-12 inches apart and similarly spaced from side bars 148.

The end module 140' includes a joinable side 126', which is provided with an EBL on the surface 128 of the joinable side, in this example. The joinable side 126' comprises a partial finless passage 127. When joined to a similar joinable side 126', a functional coupled boiling passage 130 is formed by coupling adjacent partial finless passages. Inboard from each joinable side 126' is a cooling passage 122.

FIG. 3 shows a brazed aluminum heat exchanger middle module 150. The middle module 150 includes side bars 148, extending between which are interleaved finned cooling passages 122 provided with fins 144 and finless boiling passages 124. The middle module 150 includes a pair of joinable sides, 126, 126'.

The joinable side 126 of the middle module 150 comprises a partial finless passage 129. When joined to the partial finless passage 125 of module 140, a nonfunctional coupled passage 132 is formed by coupling adjacent partial finless passages. The joinable side 126' of the middle module 150 comprises a partial finless passage 131. When joined to the partial finless passage 127 of module 140', a functional coupled passage 130 is formed by coupling adjacent partial finless passages.

It will be understood that both joinable sides 126, 126' of the middle module 150 will preferably be of a similar construction, so as to form either functional or nonfunctional coupled passages when joined to other middle or end modules. However, for purposes of illustration the various embodiments of the invention, the example shown includes plain joinable sides 126 lacking an EBL, for forming a nonfunctional coupled passage 132, and an opposite functional joinable side 126' provided with a high performance nucleate boiling surface 128, i.e., an enhanced boiling layer, to form a functional coupled boiling passage 130 when two such joinable sides are connected together.

The middle module 150 is constructed with a cooling passage 122 adjacent each of the joinable sides 126, 126'. As in the end modules 140, 140', each of the boiling passages 124 include permanent support bars 146. Preferably, the support bars 146 are provided in pairs and may be spaced in a configuration from about 8-12 inches apart and similarly spaced from side bars 148.

Figure 5:
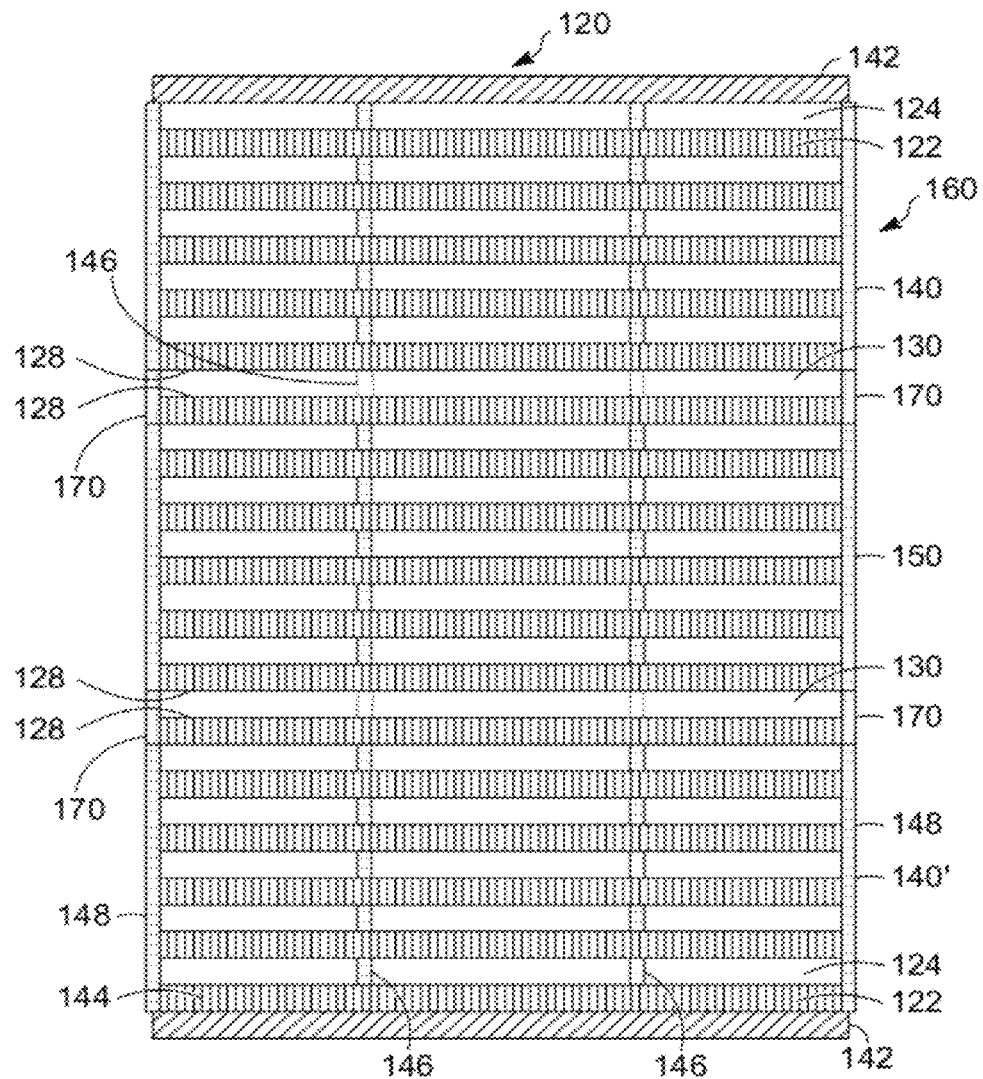
FIG. 5 is a cross sectional view of a brazed aluminum heat exchanger core assembly comprising the modules of FIGS. 2-4.

The assembled heat exchanger 160 is shown in FIG. 5 in a simplified form. It will be understood that the general brazing and assembly steps to manufacture such a heat exchanger are well known in the art. However, assembly details and methods can be gleaned from U.S. Patent Publication No. 2008/0041573, which is incorporated herein by reference.

The assembled heat exchanger core 160, in this embodiment, includes a bottom module 140' (see FIG. 4) is affixed, preferably by welding to a preferred embodiment of a middle module 150 (see FIG. 3), which, in turn, is welded to a top module (see FIG. 2). In this example the top module is similar to the bottom module. In a preferred embodiment, both coupled passages 130 formed by connecting the modules are functional boiling passages provided with an EBL 128, but it will be understood that in an alternate embodiment, the coupled passages could be nonfunctional.

Assembled, the heat exchanger core 160 includes alternating cooling passages 122 with fins 144 and finless boiling passages 124. Flanking each of the coupled passages 130 is a cooling passage 122. Side bars 148 provide structural support to the core 160. Spacer bars 146 are disposed in each of the boiling passages 124 except for the coupled passages 130. In an alternate embodiment, spacer bars could be employed in the coupled passages 130.

The modules 140', 150 are connected by welding together coupling bars 170 positioned where the modules abut each other. It will be understood that after brazing the core modules 140, 140' and 150 together, and after the selected modules have been welded together into a completed heat exchanger core 160, manifolds and headers (not shown) are welded to the core as is known in the art. Similarly, conduits (not shown) are all affixed to the appropriate manifold or header. Other delivery, distribution, collection and recovery equipment may be used. A benefit of the invention is that the welding of the modules and of the associated manifolds and headers, and so on, can be done at the same time, and thus, the welding of the modules is not a significant penalty in terms of additional time and labor.

Figure 6:
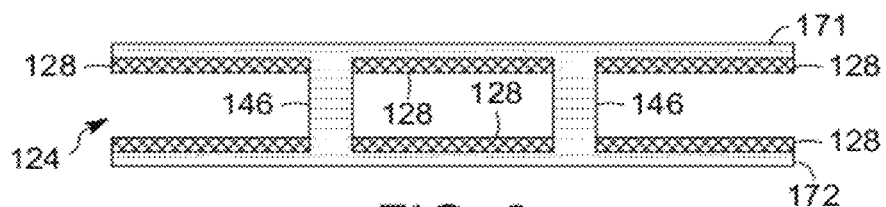
FIG. 6 is a cross sectional view of a boiling passage detail.

Turning to FIG. 6, a detail of a boiling passage 124 is shown. In particular, the passage 124 includes an upper parting sheet 171 spaced from a lower parting sheet 172. Disposed between the upper parting sheet 171 and lower parting sheet 172 are a pair of spaced apart spacer bars or permanent support bars 146. In this embodiment, the permanent support bars 146 are 5 mm×14 mm. An enhanced boiling layer 128 is disposed on the inner surfaces of the upper parting sheet 171 and lower parting sheet 172. The enhanced boiling layer can be provided in the range of 0.3-0.5 mm thick. This drawing could also represent a coupled passage with an EBL.

To those skilled in the art to which this invention pertains, the above-described preferred embodiment may be subject to change or modification. Such change or modification can be carried out without departing from the scope of the invention, which is intended to be limited only by the scope of the appended claims.

The invention claimed is:

1. A method of constructing a heat exchanger, comprising:
providing a first heat exchanger core subassembly including a first joinable end, at least one cooling passage, at least one boiling passage, and a first partial finless passage arranged at the first joinable end;
providing a second heat exchanger core subassembly including a second joinable end, at least one cooling passage, at least one boiling passage, and a second partial finless passage arranged at the second joinable end;
subjecting the first heat exchanger core subassembly and the second heat exchanger core subassembly to a temperature and for a time sufficient to braze the first and second heat exchanger core subassemblies to form a brazed first heat exchanger core subassembly and a brazed second heat exchanger core subassembly; and
affixing the first joinable end of the brazed first heat exchanger core subassembly to the second joinable end of the brazed second heat exchanger core subassembly and the first partial finless passage to the second partial finless passage to form a coupled finless passage, and thereby form a heat exchanger core wherein the first and second partial finless passages include an enhanced boiling layer disposed thereon.

2. The method of claim 1, wherein the boiling passages are finless.

3. The method of claim 2, further comprising an enhanced boiling layer disposed on the surfaces of the boiling passages.

4. The method of claim 1, further comprising providing support bars in each of the boiling passages, and wherein the coupled finless passage has no support bars.

5. The method of claim 1, wherein the first heat exchanger core subassembly and the second heat exchanger core subassembly are provided with a plurality of cooling passages and a plurality of boiling passages.

6. The method of claim 1, wherein said affixing the first joinable end to the second joinable end and the first partial finless passage to the second partial finless passage to form a coupled finless passage is performed by welding.

7. The method of claim 1, further comprising providing spacer bars between the first partial finless passage and the second partial finless passage before performing said affixing step so that after said affixing step the spacer bars are positioned in the coupled finless passage.

8. The method of claim 1, wherein a cooling passage is positioned adjacent the first partial finless passage and a cooling passage is positioned adjacent the second partial finless passage.

9. The method of claim 1, further comprising:
affixing a boiling header to be in fluid communication with an inlet to the boiling passages;
affixing a cooling header to be in fluid communication with an inlet to the cooling passages;
affixing a boiling manifold to be in fluid communication with an outlet of the boiling passages; and
affixing a cooling manifold to be in fluid communication with an outlet of the cooling passages.

10. A method of constructing a heat exchanger, comprising:
providing a first heat exchanger core subassembly including a first joinable end, at least one cooling passage, at least one boiling passage, and a first partial finless passage arranged at the first joinable end;
providing a second heat exchanger core subassembly including a second joinable end, at least one cooling passage, at least one boiling passage, and a second partial finless passage arranged at the second joinable end;
providing a third heat exchanger core subassembly, the third heat exchanger core subassembly including a pair of joinable ends positioned on opposite ends of the third heat exchanger core subassembly, the third heat exchanger core subassembly further including at least one cooling passage, at least one boiling passage, a third partial finless passage positioned at one of the pair of joinable ends and a fourth partial finless passage positioned at the other of the pair of joinable ends,
subjecting the first heat exchanger core subassembly, the second heat exchanger core subassembly, and the third heat exchanger core subassembly to a temperature and for a time sufficient to braze the first, second, and third heat exchanger core subassemblies; and
affixing one of the pair of joinable ends at the third partial finless passage to the first partial finless passage of the first heat exchanger core subassembly, and affixing the other of the pair of joinable ends at the fourth partial finless passage to the second partial finless passage of the second heat exchanger core subassembly to form corresponding coupled finless passages and a heat exchanger core wherein the first and second partial finless passages include an enhanced boiling layer disposed thereon.

11. The method of claim 10, further comprising providing support bars in each of the boiling passages, and wherein the coupled finless passages have no support bars.

12. The method of claim 10, wherein a cooling passage is positioned adjacent each of the first partial finless passage, the second partial finless passage, the third partial finless passage, and the fourth partial finless passage.

* * * * *